D. REPONY.
CLUTCH FACING.
APPLICATION FILED JULY 3, 1919.
1,341,673. Patented June 1, 1920.
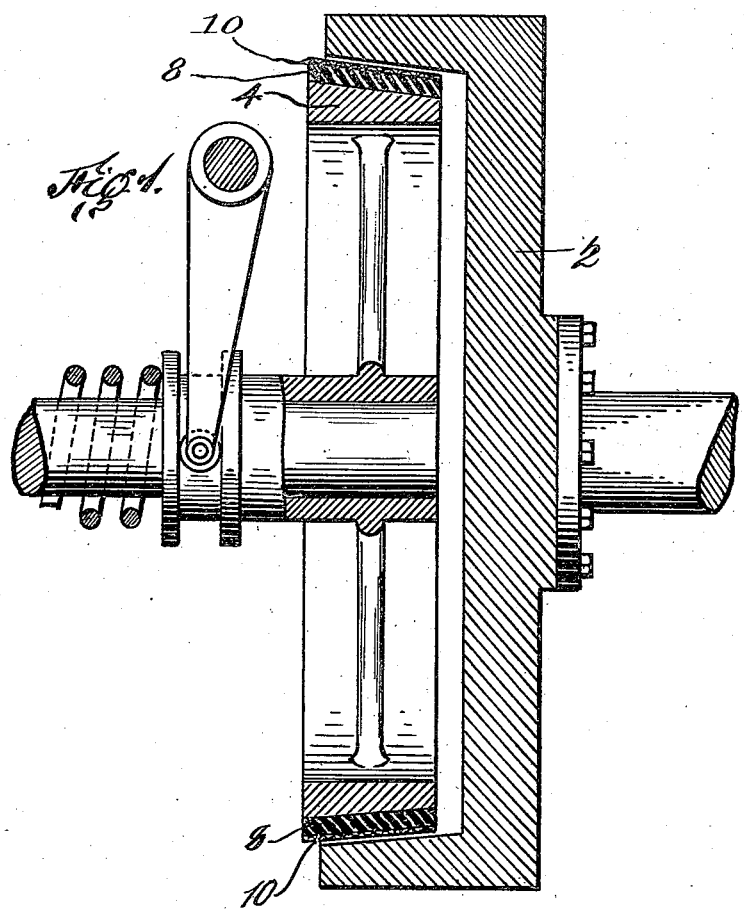
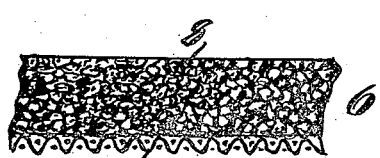
INVENTOR
Daniel Repony
BY
Emerson R. Newell
ATTORNEY

UNITED STATES PATENT OFFICE.

DANIEL REPONY, OF PASSAIC, NEW JERSEY, ASSIGNOR TO THE MANHATTAN RUBBER MFG. COMPANY, A CORPORATION OF NEW JERSEY.

CLUTCH-FACING.

1,341,673.   Specification of Letters Patent.   Patented June 1, 1920.

Application filed July 3, 1919. Serial No. 308,415.

*To all whom it may concern:*

Be it known that I, DANIEL REPONY, a citizen of the United States, residing at Passaic, county of Passaic, and State of New Jersey, have invented certain new and useful Improvements in Clutch-Facings, of which the following is a clear, full, and exact description.

My invention relates to friction clutches having engaging faces, and more particularly to the material used in one of the clutch faces, and an object of the invention is the provision of such a material as will enable the clutch to close smoothly, to the end that in applying the clutch to an automobile, for example, the clutch does not "grab" but takes hold gradually and without slipping when fully engaged. Other objects and advantages will be apparent from the following detailed description and claims when taken in connection with the accompanying drawing, in which—

Figure 1 is a sectional view of a friction clutch showing my improved material applied to one member thereof; and Fig. 2 is an enlarged cross-section of the material forming the clutch face.

Heretofore in friction clutches, especially cone clutches, it has been customary to use a leather facing on one of the clutch members, and in order to reduce to a minimum the "grabbing" effect occasioned by the use of leather, it has heretofore been the custom to employ a number of metal springs inserted around the periphery of the cone and engaging the inner face of the leather. As the clutch closes, the portions of the leather facing which are elevated by reason of the springs, first engage the corresponding clutch member and cause the clutch to take hold, the whole surface of the leather gradually engaging. There are, however, a number of disadvantages in the use of springs in this manner, such as the clutch "grabbing" at times and at other times slipping. Furthermore, due to the fact that the entire clutching action during the early stages of engagement of the two clutch members comes entirely upon those portions of the leather above the springs, the heat of friction is concentrated at these points and causes a rapid wearing and deterioration of the leather. The co-efficient of friction is also altered so that the leather, after short wear, acts very differently from new leather.

I have found that a clutch facing, including as part of its make up, a resilient material so made as to have within it a multitude of closed air cells will permanently overcome the troubles heretofore experienced.

In carrying out my invention in practical form, I have shown in Fig. 1 a clutch comprising a relatively stationary clutch member 2 and a movable clutch member 4, the faces of the two clutch members being cone-shaped, as shown, the clutch member 4 having a facing 6 composed of the resilient material referred to above. In practice I have found that spongy rubber is well suited to the purpose, although of course other resilient substances having rubber-like property may be used. It is important that the resilient material completely inclose the air cells because it is, partly by reason of the resiliency of the air contained in such cells, that the desirable cushioning effects are produced. The air cells too, are of pin head size, by which I mean that they are of substantial size as distinguished from the minute air cells contained in wool, cotton, or even ordinary rubber. In Fig. 2 is shown a portion of my improved facing material on an enlarged scale and in said figure, 8 represents the air cells which are completely inclosed within the resilient material. I also prefer to use a facing layer 10 outside of the resilient material, said facing layer being formed of cotton duck or woolen cloth vulcanized thereto, or a very thin ply of soft leather, or like materials firmly attached; so that the whole is compressible but substantially non-stretchable.

With my new material applied to the clutch of an automobile, I have found that the car will start very gently. Also, (when no springs are used) practically the whole surface of the facing comes in contact with the opposite face of the clutch and the heat of friction is distributed throughout the entire surface, and consequently there is no tendency to heat some parts unduly. I have also found that the resilient material thus formed must be very soft, the best results being obtained by the use of spongy elastic material of at least 275 plastometer test.

It is of course understood that variations may be resorted to within the scope of the invention as defined by the appended claims.

What I claim as new is:

1. A friction clutch having engaging faces, one of said faces comprising spongy rubber inclosing a multitude of closed pinhead air cells.

2. A friction clutch having engaging faces, one of said faces formed of resilient material inclosing a multitude of air cells and being of a softness of at least 275 plastometer test.

3. A friction clutch having engaging faces, one of said faces formed of spongy rubber of a softness of at least 275 plastometer test.

Signed at Passaic, New Jersey, this 26th day of June, 1919.

DANIEL REPONY.

Witness:
HARRY E. SMITH.